United States Patent
Kinney, Jr. et al.

(10) Patent No.: US 6,564,192 B1
(45) Date of Patent: May 13, 2003

(54) METHOD AND SYSTEM FOR DIFFERENTIAL INDEX BIDDING IN ONLINE AUCTIONS

(75) Inventors: Sam E. Kinney, Jr., Sewickley, PA (US); Vincent F. Rago, Pittsburgh, PA (US); Glen T. Meakem, Sewickley, PA (US); Robert G. Stevens, Pittsburgh, PA (US); David J. Becker, Sewickley, PA (US); Anthony F. Bernard, Wexford, PA (US); William D. Rupp, Pittsburgh, PA (US); Daniel C. Heckmann, Pittsburgh, PA (US); Julia L. Rickert, Wexford, PA (US); David M. Sobie, Telluride, CO (US)

(73) Assignee: FreeMarkets, Inc., Pittsburgh, PA (US)

( * ) Notice: Subject to any disclaimer, the term of this patent is extended or adjusted under 35 U.S.C. 154(b) by 0 days.

(21) Appl. No.: 09/327,600

(22) Filed: Jun. 8, 1999

(51) Int. Cl.[7] ................................ G06F 17/60
(52) U.S. Cl. .......................... 705/37; 705/26
(58) Field of Search ................ 705/37, 26, 36

(56) References Cited

U.S. PATENT DOCUMENTS

| | | | |
|---|---|---|---|
| 3,581,072 A | 5/1971 | Nymeyer ................. | 235/152 |
| 4,674,044 A | 6/1987 | Kalmus et al. ........... | 364/408 |
| 4,789,928 A | 12/1988 | Fujisaki ................ | 364/401 |
| 4,845,625 A | 7/1989 | Stannard ................ | 364/407 |
| 4,992,940 A | 2/1991 | Dworkin ................ | 364/408 |
| 5,136,501 A | 8/1992 | Silverman et al. ....... | 364/408 |
| 5,193,056 A | 3/1993 | Boes ................... | 364/408 |
| 5,243,515 A | 9/1993 | Lee .................... | 364/401 |
| 5,297,032 A | 3/1994 | Trojan et al. .......... | 364/408 |
| 5,375,055 A | 12/1994 | Togher et al. .......... | 364/408 |
| 5,394,324 A | 2/1995 | Clearwater ............. | 364/408 |
| 5,402,336 A | 3/1995 | Spiegelhoff et al. ..... | 364/401 |
| 5,606,602 A | 2/1997 | Johnson et al. ......... | 379/115 |
| 5,664,115 A | 9/1997 | Fraser ................. | 705/37 |
| 5,684,963 A | 11/1997 | Clement ................ | 395/226 |
| 5,689,652 A | 11/1997 | Lupien et al. .......... | 395/237 |
| 5,715,402 A | 2/1998 | Popolo ................. | 395/237 |
| 5,727,165 A | 3/1998 | Ordish et al. .......... | 395/237 |
| 5,758,327 A | 5/1998 | Gardner et al. ......... | 705/26 |
| 5,758,328 A | 5/1998 | Giovannoli ............. | 705/26 |
| 5,765,138 A | 6/1998 | Aycock et al. .......... | 705/7 |
| 5,774,873 A | 6/1998 | Berent et al. .......... | 705/26 |
| 5,794,207 A | 8/1998 | Walker et al. .......... | 705/23 |

(List continued on next page.)

FOREIGN PATENT DOCUMENTS

| | | | | |
|---|---|---|---|---|
| WO | 97/37315 | 10/1997 | | |
| WO | 0075848 | * 6/2000 | ........... | G06F/17/60 |

OTHER PUBLICATIONS

Beaton, W "Impact of Regional Land Use Controls on Property Values" Land Economics—v67,n2 p172(32)—May, 1991*

Malone et al., "The Logic of Electronic Markets", *Harvard Business Review*, No. 893II (May–Jun., 1989).

Freemarkets™ Online, "Bidware Manual" (Jun. 9, 1988).

Freemarkets Online™, "Online Industrial Market Making, An Overview of Purchasing Executives".

(List continued on next page.)

*Primary Examiner*—Vincent Millin
*Assistant Examiner*—Geoffrey Akers
(74) *Attorney, Agent, or Firm*—Morgan, Lewis & Bockius LLP (57) ABSTRACT

A method and system for conducting electronic online auctions between a plurality of potential bidders using differential index bidding is disclosed. The originator of the auction specifies one or more indexes as the basis for establishing a competitive price point. The index can be a published market index, or a proprietary price array developed by the buyer. The bidders specify bids as a percentage or absolute amount off of the one or more indexes. The originator of the auction compares the submitted bids and provides feedback to the bidders.

25 Claims, 6 Drawing Sheets

U.S. PATENT DOCUMENTS

| | | | | |
|---|---|---|---|---|
| 5,794,219 | A | | 8/1998 | Brown ......................... 705/37 |
| 5,797,127 | A | | 8/1998 | Walker et al. .................. 705/5 |
| 5,799,151 | A | | 8/1998 | Hoffer ................... 395/200.34 |
| 5,799,285 | A | * | 8/1998 | Klingman .................... 705/26 |
| 5,802,502 | A | | 9/1998 | Gell et al. ..................... 705/37 |
| 5,809,483 | A | * | 9/1998 | Broka et al. .................. 705/37 |
| 6,044,363 | A | * | 3/2000 | Mori et al. .................... 705/37 |
| 6,055,518 | A | * | 4/2000 | Franklin et al. ............... 705/37 |
| 6,061,663 | A | * | 5/2000 | Bloom et al. ................. 705/36 |
| 6,161,099 | A | * | 12/2000 | Harrington et al. ........... 705/37 |
| 6,199,050 | B1 | * | 3/2001 | Alaia et al. ................... 705/37 |

OTHER PUBLICATIONS

WebAuction.com, "How to Play" (1998).
Auction Sales, "Live Auctions Online" (Sep. 1998).
Auction Port, "Online Auction Community—New Auctions Since Sep. 2, 1998" (Jul. 1998).
OnSale, "How to Play" (1998).
u–Auction–It™ (1997).
Freemarkets Online™, "Homepage" (1998).
Andrews, "Auctions Catch the Interest of Hobbyists and Big Business", Aug. 24, 1998.
Associated Press, "Auction on Web is Buyer's Market", Apr. 6, 1998.
Steinert–Threlkeld, "New Watchwords: Let Sellers Beware", Jun. 1, 1998.
Wolley, "E–muscle", Mar. 9, 1998.
Associated Press, "FreeMarkets Takes Auction on Internet", Feb. 23, 1998.
Jahnke, "How Bazaar" (Aug. 27, 1998).
Wilder, "What's Your Bid?—FreeMarkets' real–time online bidding technology lets clients drive down costs and improve product value", Nov. 10, 1997, *Information Week*.
Jean–Pierre Banatre, et al., "The Design and Building of Enchere, a Distributed Electronic Marketing System" Communications of the ACM, No. 1 (Jan. 29, 1986).
Danny Cohen, "Computerized Commerce" Information Processing 89 (Aug. 28–Sep. 1, 1989).

* cited by examiner

|  | COORDINATOR | BUYER | SUPPLIER |
|---|---|---|---|
| INITIAL CONTACT 102 | CONTACT BUYER | PROVIDE DATA |  |
| RFQ 104 | COLLECT & ADMINISTER RFQ DATA | PROVIDE RFQ DATA |  |
|  | PUBLISH & ADMINISTER RFQ |  | ACCESS RFQ |
|  | MANAGE RFQ RESPONSE |  | RESPOND TO RFQ |
| AUCTION ADMINISTRATION 106 |  | REQUEST AUCTION |  |
|  | COORDINATE & ADMINISTER AUCTION SETUP |  |  |
|  | ASSIST & ADMINISTER USER AUCTION PREP |  | PREPARE FOR AUCTION |
| CONDUCT AUCTION 108 | ASSIST & ADMINISTER AUCTION | OBSERVE | BID |
| ADMINISTER AUCTION RESULTS 110 | ANALYZE & ADMINISTER AUCTION RESULTS | VIEW AUCTION RESULTS | VIEW AUCTION RESULTS |
| CONTRACT ADMINISTRATION 112 |  | SETTLEMENT | SETTLEMENT |

METHOD AND SYSTEM FOR DIFFERENTIAL INDEX BIDDING IN ONLINE AUCTIONS

BACKGROUND OF THE INVENTION

The disclosed invention relates generally to conducting online electronic auctions, and in particular to online electronic auctions featuring differential index bidding.

Traditional Procurement Models

Procurement of supplies has traditionally involved high transaction costs, especially information search costs. The introduction of electronic commerce has introduced new methods of procurement that lower some of the transaction costs associated with procurement. Online procurement, or business-to-business electronic commerce, matches buyers and suppliers so that transactions can take place electronically. There are three models for online procurement: catalog, buyer-bidding auction, and supplier-bidding auction.

The "catalog" model of online procurement was the first to be developed. The first electronic catalogs were developed by suppliers to help customers obtain information about products and order supplies electronically. These first electronic catalogs were single-source; i.e. they only allowed customers to obtain information and products from that supplier.

However, customers are not typically satisfied with being "locked in" to one supplier—they wanted to be able to compare a number of competing products to be sure of getting the product features they wanted, at the best price. So suppliers with single-source electronic catalogs started to include competitors' products on their systems. An example of this is American's SABRE system, which includes offerings from competing suppliers (airlines), thereby further reducing information search costs. By offering competing products, the electronic catalog that offers competitor's products becomes an "electronic market".

Many of these systems are biased towards the supplier offering the electronic market. Procurement costs can be further lowered with an unbiased electronic market that promotes competition.

For standard products and services, the need to have an unbiased market has been met for many industries by third party "market makers." For example, Inventory Locator Services has compiled a database that lists all airplane parts suppliers that have a certain item in stock. Buyers dial into the database to get information on the parts they need. Here, it is a third party, Inventory Locator Service, not a supplier, creating the unbiased electronic market.

The electronic catalog model of electronic commerce involves one buyer and one supplier at a time. When many buyers compete for the right to buy from one supplier, a buyer-bidding auction model is created. A noteworthy example of the buyer-bidding auction model is that operated by PriceLine.com and described in U.S. Pat. No. 5,794,207 issued to Walker et al. In this system, potential buyers compete for airline tickets by submitting a bid for an airline ticket on the PriceLine website, and airlines can choose to accept a bid, thereby committing the buyer to buy the ticket.

The catalog and buyer-bidding auction types of electronic markets do not work in some situations however. If the required product is custom made for the buyer, it is not possible for suppliers to publish a set price in advance for a catalog market. Likewise, it is not possible for buyers to specify all of the details of the product they want to purchase in a buyer-bidding auction. Traditionally, when a company requires a custom industrial product, procurement is made by a buyer for the company who searches for a potential supplier and acquires custom-tailored price quotes from a supplier for the needed custom product. The search is slow and somewhat random because it usually relies heavily on personal relationships. The costs associated with locating vendors, comparing their products, negotiating, and paperwork become big factors in a purchase decision. The cost of switching suppliers is very large, which means that the quoted price is probably not the lowest fair price and that it is hard for a new supplier to enter the market.

As an alternative, buyers use auctions to save money. The assignee of the present application developed a system wherein suppliers downwardly bid against one another to achieve the lowest market price in a supplier-bidding auction.

Supplier-Bidding Auction

In a supplier-bidding auction, bid prices typically start high and move downward in reverse-auction format as suppliers interact to establish a closing price. The auction marketplace is one-sided, i.e. one buyer and many potential suppliers. Typically, the products being purchased are components or materials. "Components" typically mean fabricated tangible pieces or parts that become part of assemblies of durable products. Example components include gears, bearings, appliance shelves, or door handles. "Materials" typically mean bulk quantities of raw materials that are further transformed into product. Example materials include corn syrup or sheet steel.

Industrial buyers do not typically purchase one component at a time. Rather, they purchase whole families of similar components. At times, components are strongly related to one another. As an example, a buyer might purchase a given plastic knob in two different colors, or might purchase a nameplate in four different languages. These parts are so similar that by definition they must be purchased from the same supplier—all of the knobs are made using the same mold. These items are therefore grouped into a single lot. Suppliers in industrial auctions must provide unit price quotes for all line items in a lot.

Auction Process

Figure 1:
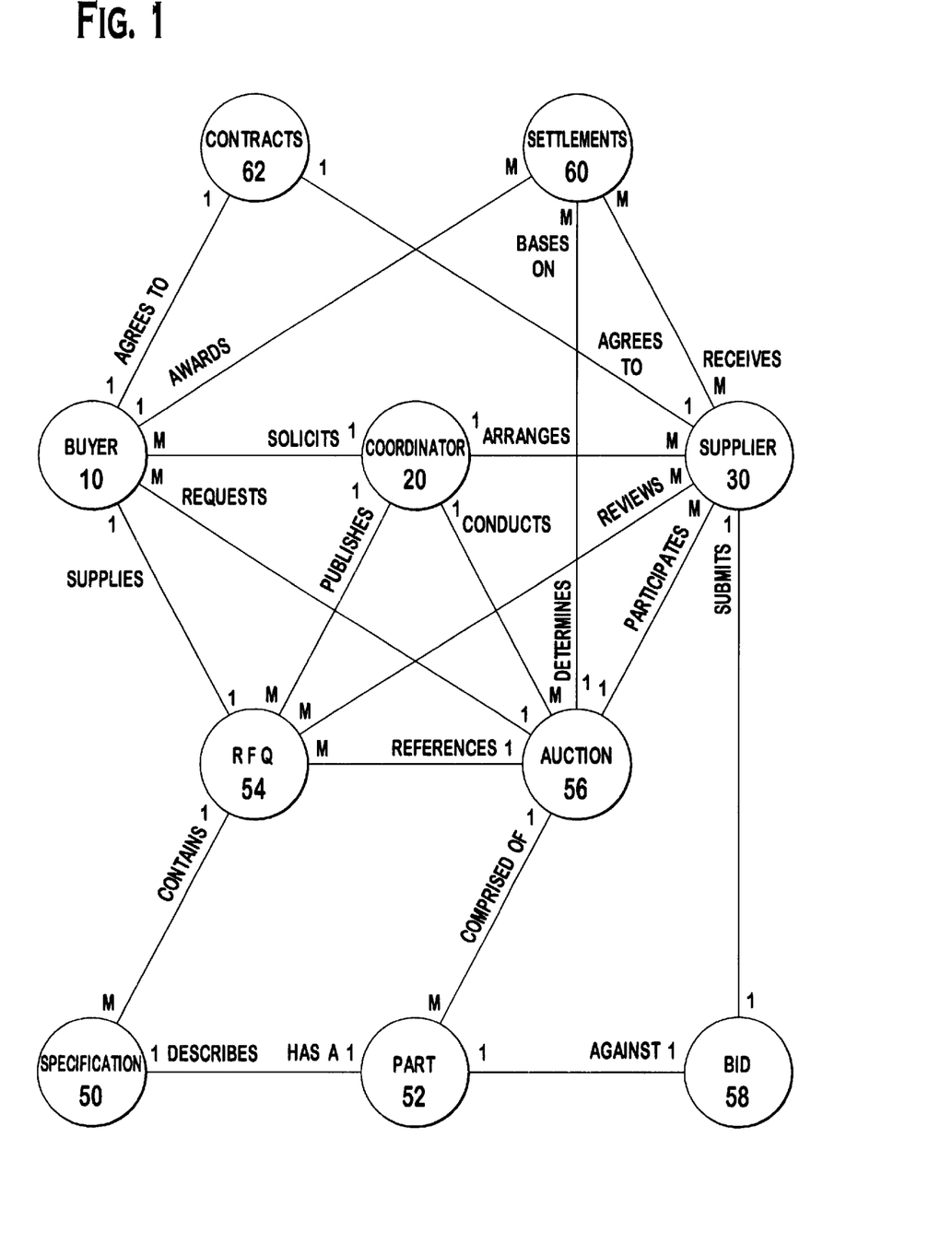
FIG. 1 illustrates the elements and entities involved in an auction process.

The process for a supplier-bidding auction is described below with reference to FIGS. 1 and 2. FIG. 1 illustrates the functional elements and entities in a supplier-bidding auction, while FIG. 2 is a process diagram that identifies the tasks performed by each of the involved entities.

The supplier-bidding auction model requires that the bidding product or service be defined by the buyer 10. An auction coordinator 20 works with buyers 10 to prepare for and conduct an auction and to define the potentially new supply relationships resulting from the auction.

Figure 2:
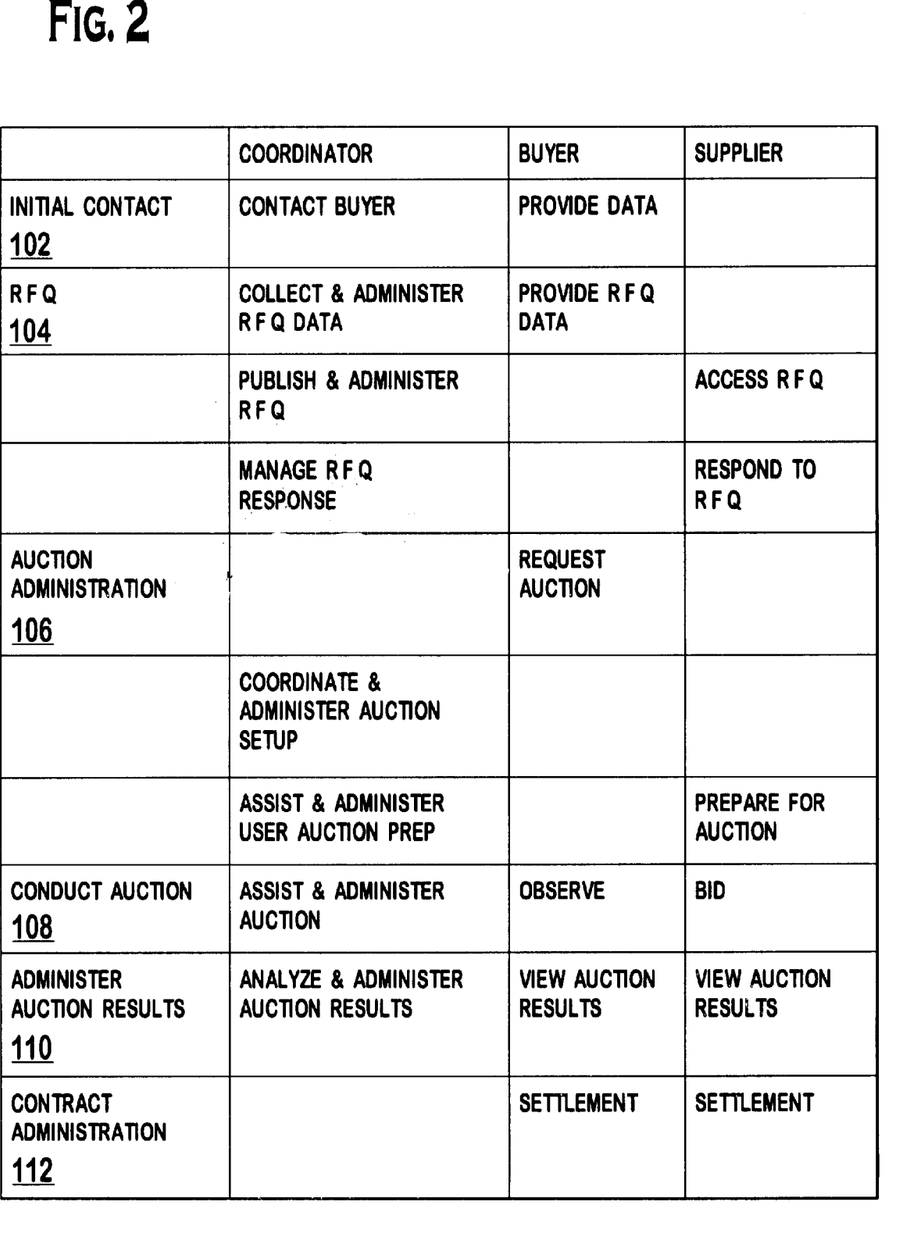
FIG. 2 illustrates the tasks performed by the entities involved in an auction process.

As shown in FIG. 2, in the Initial Contact phase 102 of the auction process, the coordinator 20 contacts the buyer 10, and the buyer 10 provides data to the coordinator 20. The coordinator 20 prepares a specification 50 for each desired product or part 52. Once the product 52 is defined, potential suppliers 30 for the product are identified. The coordinator 20 and buyer 10 work together to compile this list of potential suppliers from suppliers already known to the buyer 10 as well as suppliers recommended by the coordinator 20.

The buyer 10 makes a decision regarding which potential suppliers 30 will receive invitations to the upcoming Auction. Suppliers 30 that accept Auction invitations are then sent notices regarding the upcoming Auction, as well as client software to install in preparation of participating in the Auction.

In the RFQ phase 104, the coordinator 20 works with the buyer 10 to prepare a Request for Quotation ("RFQ") 54. The coordinator 20 collects and maintains the RFQ data provided by buyer 10, and then publishes the RFQ 54, and manages the published RFQ 54. The RFQ 54 includes specifications 50 for all of the parts 52 covered by the RFQ 54. In the RFQ 54, buyer 10 aggregates similar part or commodity line items into job "lots." These lots allow suppliers 30 to bid on that portion of the business for which they are best suited.

During the auction 56, bids 58 will be taken against individual lots (and their constituent parts 52) within RFQ 54. While suppliers 30 must submit actual unit prices for all line items, the competition in an Auction is based on the aggregate value bid for lots. The aggregate value bid for a lot depends upon the level and mix of line item bids and the quantity for each line item. Therefore, suppliers 30 submit bids at the line item level, but compete on the lot level.

In the Auction Administration phase 106, coordinator 20 coordinates the Auction and administers the Auction setup and preparation. The coordinator 20 sends a RFQ 54 to each participating supplier 30, and assists participating suppliers 30 with preparation for the Auction.

In the Auction phase 108, suppliers 30 submit bids 58 on the lots and monitor the progress of the bidding by the participating suppliers 30. The coordinator 20 assists, observes, and administers the Auction.

When the bidding period is over, the auction enters the Auction Results Administration phase 110. In this phase, coordinator 20 analyzes and administers the Auction results, which are viewed by buyer 10. The buyer 10 begins to conduct final qualification of the low bidding supplier(s). The buyer 10 retains the right not to award business to a low bidding supplier 30 based on final qualification results or other business concerns.

In the ensuing Contract Administration phase 112, the coordinator 20 facilitates settlements 60 awarded by the buyer 10 to suppliers 30. Contracts 52 are then drawn up between buyer 10 and suppliers 30.

Communications and Software

Figure 3:
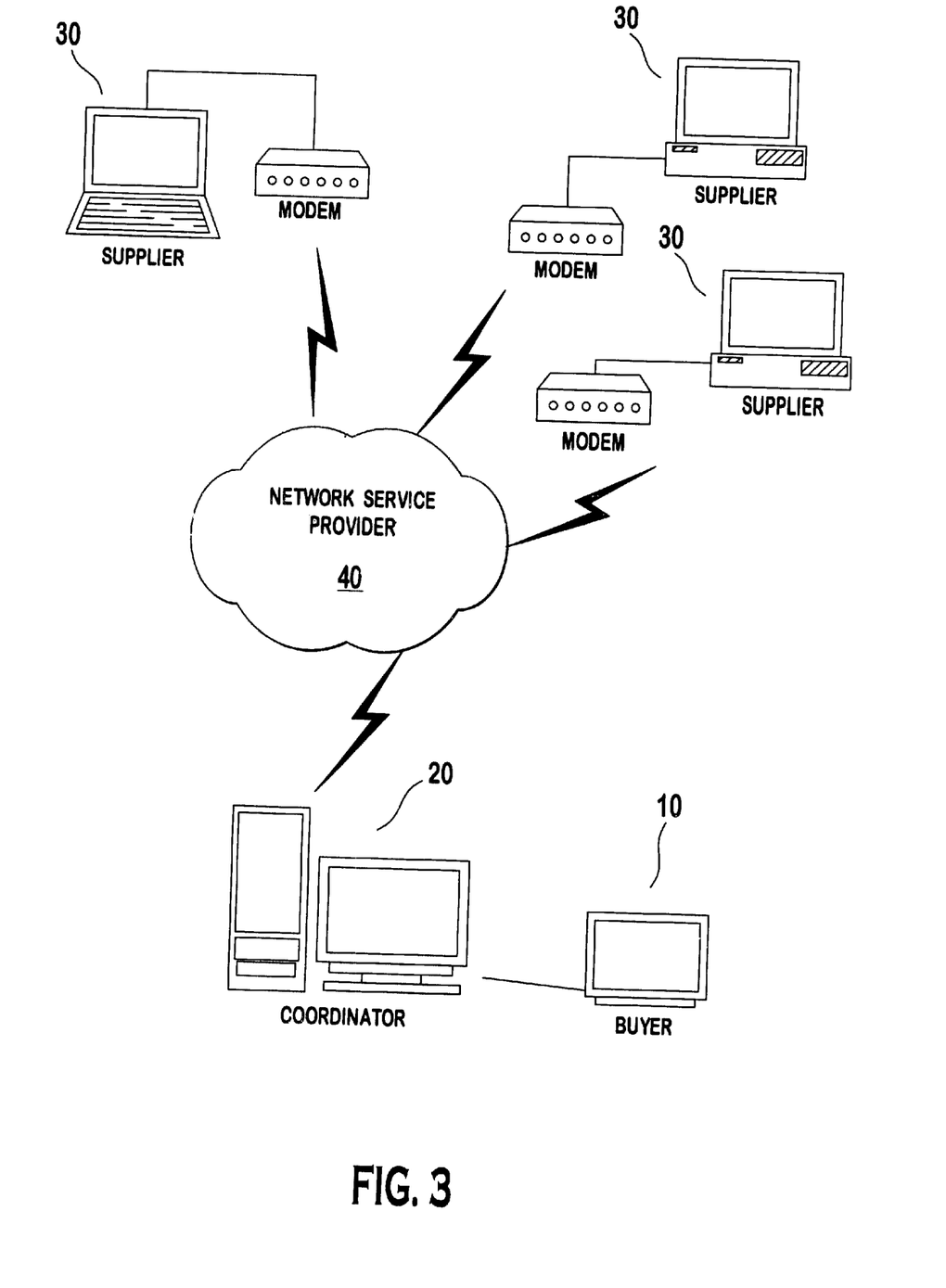
FIG. 3 illustrates the communications links between the coordinator and the potential suppliers in an auction.
Figure 4:
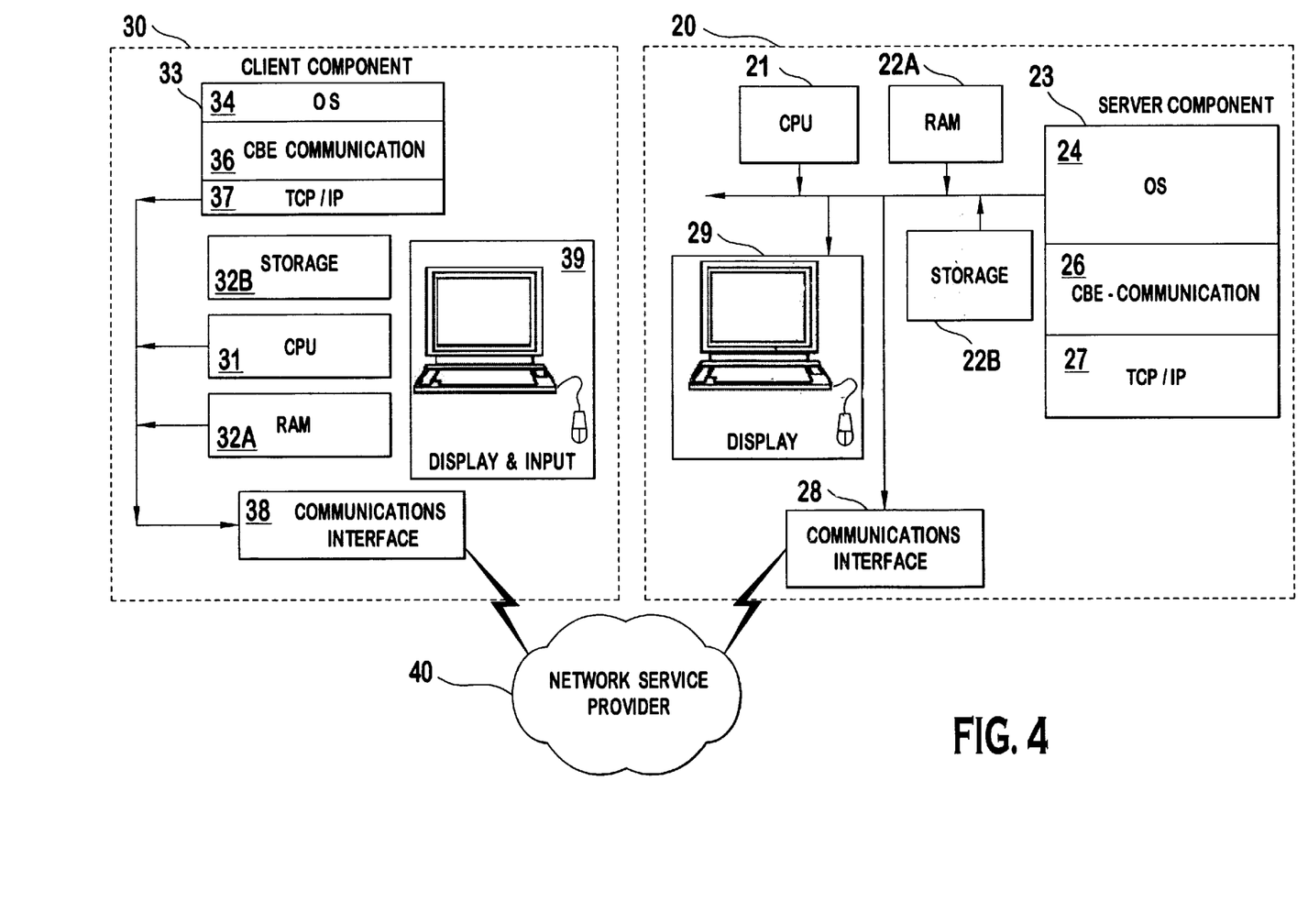
FIG. 4 illustrates the client and server components of the computer software application that conducts the auction and the hardware at the sites of the coordinator and the potential suppliers on which the client and server components operate.

The Auction is conducted electronically between potential suppliers 30 at their respective remote sites and the coordinator 20 at its site. As shown in FIGS. 3 and 4, information is conveyed between the coordinator 20 and the suppliers 30 via a communications medium such as a network service provider 40 accessed by the participants through, for example, dial-up telephone connections using modems, or direct network connections. A computer software application is used to manage the Auction. The software application has two components: a client component 31 and a server component 23. The client component 31 operates on a computer at the site of each of the potential suppliers 30. The client component is used by suppliers 30 to make bids during the Auction. The bids are sent via the network service provider 40 to the site of the coordinator, where it is received by the server component 23 of the software application. The client component 31 includes software used to make a connection through telephone lines or the Internet to the server component 23. Bids 58 are submitted over this connection and updates are sent to connected suppliers.

Bids 58 can only be submitted using the client component 31 of the application—this ensures that buyers do not circumvent the bidding process, and that only invited suppliers participate in the bidding. Typically, bidders can see their bids and bids placed by other suppliers for each lot on the client component 31. When a bidder submits a bid, that bid is sent to the server component 23 and evaluated to determine whether the bid is from an authorized bidder, and whether the bid has exceeded a pre-determined maximum acceptable price. Bids placed by a supplier are broadcast to all connected bidders thereby enabling every participating bidder to see quickly the change in market conditions and begin planning their competitive responses.

SUMMARY OF THE INVENTION

In traditional online auctions for industrial components and materials, bidders submit price quotes in absolute values, typically dollars or dollars per unit. This works well when the buyer requires a single fixed price for a spot buy or over the term of the contract and the price of the component or material is relatively stable. In situations where the prices are relatively volatile, however, the supplier's cost and profit can diverge widely from the negotiated fixed price.

The present invention increases the competitive dimensions upon which an auction is run by enabling suppliers to compete over the length of the contract, not just the initial fixed price. Competition over the length of the contract is enabled through a bidding process that is performed relative to a predefined cost or price index. The index, or combination of indices are specified prior to the auction and communicated to all bidders. During the auction, bids are stated in terms that are relative to the current and future values of this index. Bids can be a percentage or absolute differential relative to the index, depending on the needs of the particular market. In addition, bids can be positive, zero or negative depending on whether bidders wish to bid above (premium), at, or below (discount) the nominated index.

The bidding process can be run against any arbitrarily defined index that can be calculated at points in the future. The index is time-varying and can be based upon one or more industry published indexes. Alternatively, the index can be based upon a formula that is defined by an industry or by the originator of the auction.

The present invention can separately specify the form of a bidder's bid and the display of that bid. Bids can be accepted for only the amount representing the differential, or may be accepted as the differential added to a starting value of the index. Further, bids can be displayed as differentials or as "gross" including a starting value of the index.

It is therefore a feature of the present invention that the index bidding process allows a buyer to procure supplies more efficiently. For example, a buyer who traditionally makes sporadic purchases from a catalog may originate an auction where the potential suppliers bid a discount off the published prices for future procurements. In this way, the buyer is able to secure a discount rate that will apply to all future purchases, without having to specify an exact order at the time of the auction.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION

Reference will now be made in detail to the preferred embodiments of the present invention, examples of which are illustrated in the accompanying drawings. The present invention described below extends the operation of the inventive auction system and method described in greater detail in co-pending application Ser. No. 09/252,890, entitled "Method and System for Conducting Electronic Auctions," filed Feb, 19, 1999, the disclosure of which is hereby expressly incorporated in the present application.

Online electronic auctions provide a powerful interactive medium for creating and capitalizing upon traditional auction dynamics. The extensive reach of online auctions combined with inherent forms of anonymity make them an attractive choice for virtually any auction sale.

In traditional online electronic auctions, competition for a spot buy is based on comparing absolute price bids. For example, in the auction for a collectible item, the online auction software performs a simple price comparison that enables a ranking of bids from lowest to highest. This ranking of bids can be presented to each of the auction participants.

Unlike markets for spot buys, the markets for many materials and commodities are based upon contracts over a period of time. Examples of such markets include scrap metal markets. For example, a manufacturer (the buyer) might require a certain amount of scrap copper to be delivered to their facilities on a monthly basis. In conventional auctions for industrial components and materials, bidders submit price quotes in absolute values, typically dollars or dollars per unit. This works well when the buyer requires a fixed price over the term of the contract and the price of the component or material is relatively stable.

During the contract period, however, prices of an underlying product can change rapidly as supply and demand changes. In these situations, a buyer is typically constrained to three purchasing techniques. A first purchasing technique is to purchase on short-term contracts with frequent renegotiations intended to keep pace with changes in the market. In effect, the buyer purchases through a series of opportunistic spot buys.

A second technique is to purchase on long-term contracts. In this technique, a fixed price is negotiated with the supplier and the parties assume the risk of price changes over the life of the contract. If the underlying cost declines, the buyer is worse off than if he had purchased spot. If the underlying cost rises, the supplier may be forced to lose money on the contract. The assumption of risk by the supplier enables the supplier to demand a higher price premium to hedge this risk. More volatile markets generally result in larger risk premiums. Buyers may wish to avoid paying suppliers a risk premium.

A third technique is to purchase on long-term contracts that define a mechanism to adjust prices over the life of the contract. If a particular contract condition is met, then prices are adjusted based upon the relative value of an index (or indices) that track movements in the underlying commodity price. In many situations, buyers and sellers negotiate the contract price, and use the adjustment mechanism merely as a contingency mechanism. In these situations, the index is not used to change the agreed-upon contract price unless there are changes in the marketplace which affect the index outside of a prescribed range.

None of the techniques that have been used for procuring supplies in a volatile market create a competitive market environment in which a buyer can achieve the lowest possible price for the needed goods or materials. All of the above techniques typically require the buyer to negotiate with the supplier on a one-to-one basis rather than have the sellers compete to get the buyer's business.

Auctions can be used by buyers to accomplish the above purchasing techniques by holding auctions for the price of a contract. In this framework, conventional auctions can be used to establish a fixed value or a starting point for a contract. This approach has serious limitations. First, this method ignores the differences in the various price adjustment mechanisms that may apply over the term of the contract. This is often more important than the price used as the starting point for the contract. The initial price will only apply until the first adjustment in price is required under the contract term, for example, the first month of an annual contract with monthly price adjustments. Thus a traditional auction will only create competition around the initial price which may apply for a short duration. Significantly, the benefit of the starting price set through the auction process only extends until the first adjustment period. Accordingly, in a rapidly fluctuating market, there is no competition between bidders over the entire length of the contract. Each of the bidders would likely be subject to the same price adjustment mechanism that is stipulated prior to the auction.

Second, with commodities where the market price is very volatile, the bidders may not be prepared to commit to the bid pricing established in the standard auction for enough time for the buyer to make an award decision. For example, in the natural gas market, a large proportion of the delivered price for natural gas depends on the underlying futures price for gas produced at the well-head. Since the futures market is very volatile, bidders will only hold bids for approximately 24 hours. The buyer, however may need 1–2 weeks to make an award decision.

The present invention provides for a competitive market that was not available before. In particular, the present invention creates competition between bidders over an entire length of the contract by creating bidding events specified relative to an index that governs the adjustment of prices over the contract term. This use of an index in the online competitive auction market is in sharp contrast to traditional contract situations where the index was only used as a method of ensuring that the price did not become unfair to either party due to unforeseen market changes.

In the present invention, bids can be submitted relative to an established index, instead of absolute dollar amounts. This feature enhances the capability of the online auction to achieve the best deal for the buyer. At the same time, supplier-bidders do not assume the risk of contracting to an absolute price in a volatile market.

These and other features of the present invention are enabled through an index bidding process that is implemented on both the auction server component and the client component.

Generally, the buyer wishes to conduct an auction to negotiate a contract where the price varies over the term according to an agreed formula (a "floating price contract"). The formula establishes a relationship between the initial contract price and an industry or market-based price index, so that movements in the index trigger changes in the contract price. The value of a floating price contract is that it allows a buyer to negotiate how the price will be determined at any point during the term without having to fix the price for the entire duration. The price can vary with changes in market conditions without the parties having to renegotiate price for each order placed during the contract term. Examples typically occur in commodities such as scrap metals, raw and alloy metals, bulk chemicals, natural gas, etc. that experience volatile price movements.

The buyer is effectively defining the price adjustment mechanism for the contract, and using the auction process to create competition relative to this index. The benefit of the competition created by the auction will not only impact the initial price, but endure for the life of the contract because the auction has forced all bidders to compete on the differential (in absolute or percentage terms) relative to the commodity price index. No matter what the changes in the underlying index, the buyer will always ensure that they will receive the most competitive differential relative to that index.

In the auction process, index bidding uses relative values around a defined arbitrary point. Since the actual value of the nominated index is constantly changing, it is irrelevant what its value is at the time of the auction. In the preferred embodiment, bidding is conducted around zero. Using zero as the arbitrary index point is intuitive for bidders, because it is obvious whether one is bidding at, above, or below the index. That is, it is easy for bidders to interpret a negative bid as being below the index (i.e. a discount), or a zero bid to be at the index, and a positive bid to be above the index (i.e. at a premium).

Figure 5:
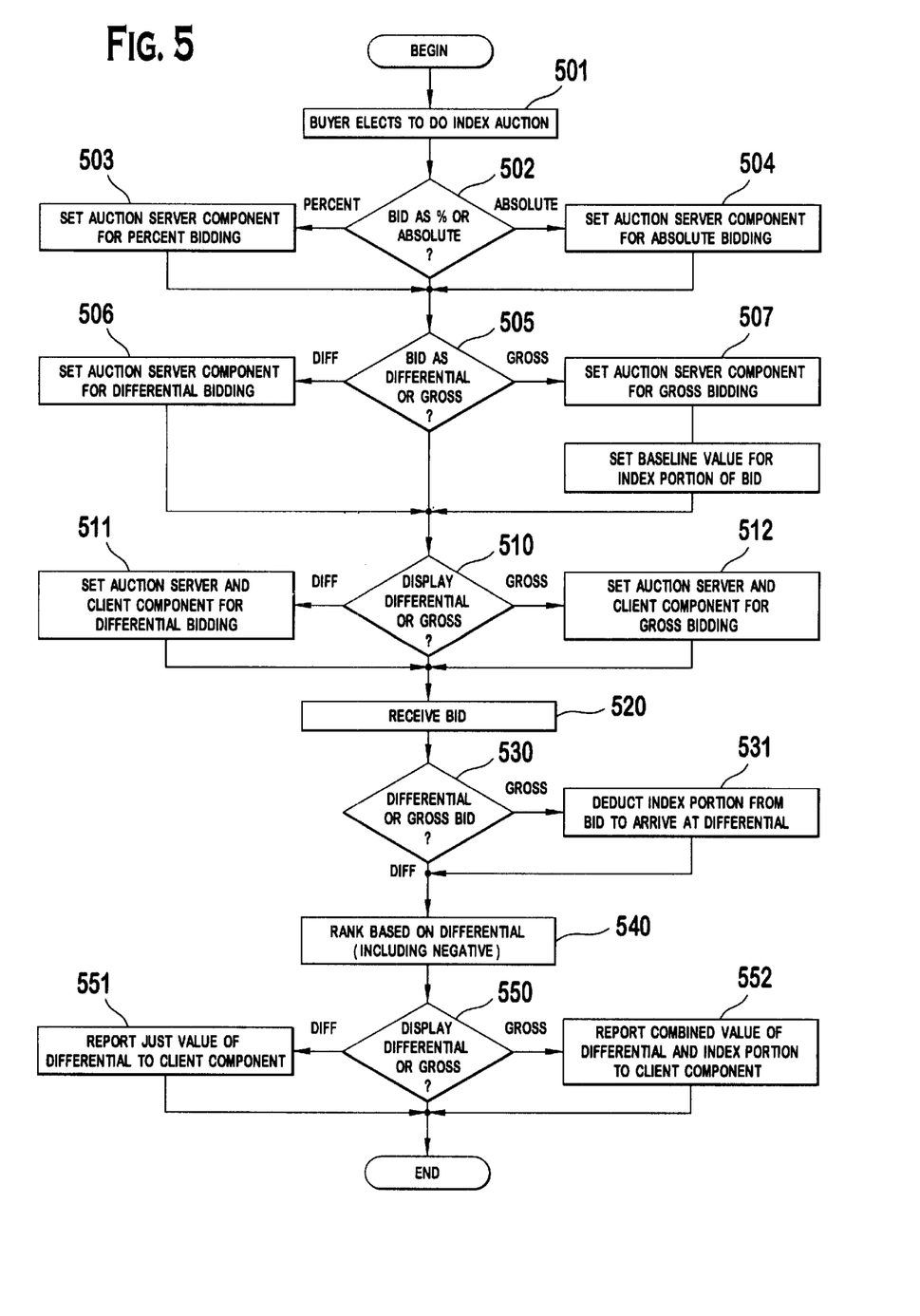
FIG. 5 illustrates a flowchart of the index bidding process.

The index bidding process can be illustrated by the flowchart illustrated in FIG. 5. As illustrated, the first step 501 is to ascertain that the buyer wishes to use an index bidding auction for a particular buy. The next steps 502–512 relate to providing instructions to the server component and the client component of the auction system to prepare for the processing and display of information in the index-bidding auction.

The system is flexible with respect to both the format of bids received and in the format of displayed results. It may be desirable for bidders to provide bids in "gross terms"— meaning that they are bidding the combined total of the differential they wish to offer from the stated index and the current or starting value of the index. This can be advantageous in situations where bidders are more familiar with working in prices stated in gross terms. The system can also accept differential values that are stated in percentage terms or in absolute terms.

An example can serve to illustrate. Let's assume that the price of a product is heavily dependent on steel. At an index price for steel of $350 per ton, the value of steel in the example product may be $100. Assume that a bidder wishes to propose a quote of $115 to produce the product. The system will allow that quote to be provided in two ways. First, the bidder could propose a price of $115 and the auction system can be instructed to deduct $100 when such a price is quoted. Alternatively, the bidder could propose the price of the differential only, or $15. The $15 difference can be stated in absolute terms, as $15, or in percentage terms as 15%. In the case of percentage terms, the actual value the bidder collects in differential will vary in the future as the underlying index value changes. Different industries have different standard practices, so the system is flexible to accept both.

At step 502, the buyer decides whether the differential shall be represented in percentage terms or in absolute currency. At step 503 or 504, the system is instructed to treat the differential in percentage and absolute terms respectively.

At step 505, the buyer decides whether to accept bids as gross bids or to accept bids representing the value of the differential.

Depending on the selection made at step 505, step 506 instructs the auction server component to look for bids including only the differential component. Alternatively, step 507 instructs the system to look for gross bids, and step 508 instructs the system of the initial value of the index portion of the bid, for use later in processing bids. The format of the bids to be submitted can be determined separately for each bidder.

The system can be further tailored to display either gross bids or differential bids. Note that the display of bids is independent of the basis upon which bids are submitted. For example, it is quite possible to accept gross bids and display only differentials, or to accept differential bids and display results in gross terms. At step 510, the system is instructed in what format to display bids. The format of display can be set separately for each bidder.

At step 511, the system is set to display only differentials, while alternatively step 512 instructs the system to display gross bids.

At step 520 a bid is received. At step 530, the auction server component determines (using the setting established in steps 506 or 507) whether the bid is a gross bid or a differential. If the bid is a gross bid, the current value of the index portion, set at step 508, is deducted before ranking bids.

At step 550, the system determines which format of bid to be displayed, hence which format to broadcast back to participants, using the values set at steps 511 or 512. If the system has been set to display differential bids, then the instructions at step 551 are executed and the bidders receive back values representing just the index value. Alternatively, at step 552, the combined value of the differential and the current value of the index portion are broadcast back to bidders.

This broadcast function creates real-time online competition between suppliers who are able to view the activities of their competitors and plan their corresponding response strategy. As in an absolute value online auction, the ability to see a competitor's bids stimulates the potential supplier to bid a lower price, or in this case a greater discount. This is not achievable in the manual process of negotiating with each potential supplier individually.

To illustrate the concepts of the present invention, consider an example auction conducted for a 6-month contract for copper scrap metal. In this market suppliers are not prepared to commit to a fixed price for the 6-month period so the auction was conducted for a 6-month floating price contract. The buyer specifies the London Metals Exchange (LME) virgin copper price index, adjusted monthly, as a basis for altering the price over the contract term. In this case, bidders submit bids in cents per pound relative to the index. An example bid history is shown below in Table 1 with the corresponding bid history graph illustrated in FIG. 6.

TABLE 1

| Bidder | Bid Time | Index Bid Amount |
|---|---|---|
| Bidder A | 1:27:03 PM | (0.0235) |
| Bidder B | 1:27:16 PM | (0.0237) |
| Bidder A | 1:27:50 PM | (0.0238) |
| Bidder F | 1:28:15 PM | (0.0239) |
| Bidder C | 1:29:29 PM | (0.0239) |
| Bidder D | 1:29:06 PM | (0.0240) |
| Bidder E | 1:29:22 PM | (0.0240) |
| Bidder C | 1:30:29 PM | (0.0241) |
| Bidder B | 1:29:43 PM | (0.0241) |
| Bidder G | 1:29:56 PM | (0.0258) |
| Bidder E | 1:30:50 PM | (0.0260) |
| Bidder B | 1:30:41 PM | (0.0290) |
| Bidder C | 1:31:27 PM | (0.0298) |

Figure 6:
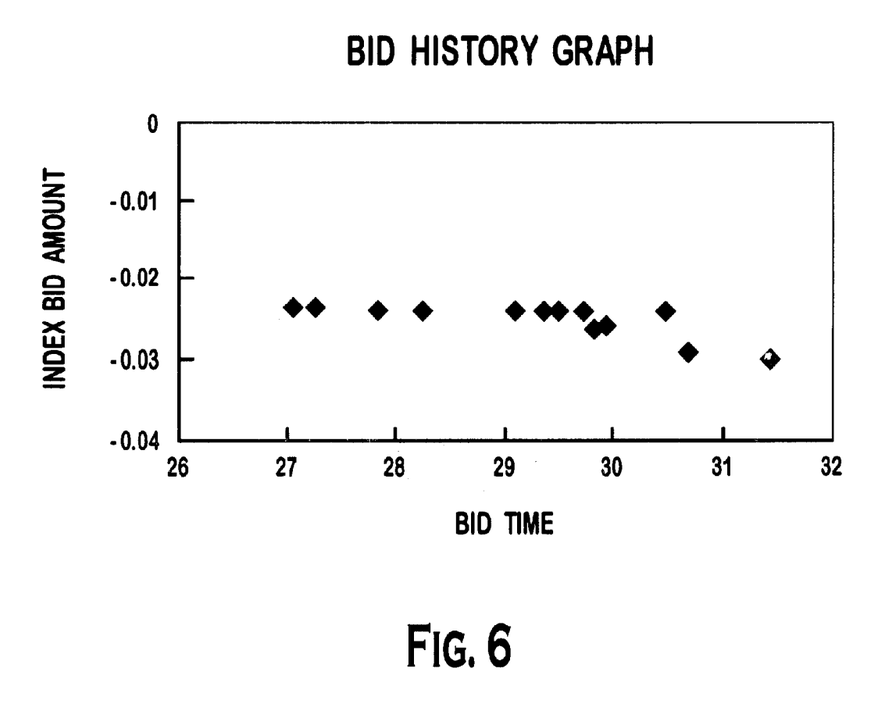
FIG. 6 illustrates an index bidding bid history graph.

The index-bidding bid history graph of FIG. 6 is a graphical illustration of the value and timing of the index-bidding bids that have been submitted by the participating suppliers. Note that FIG. 6 assumes that the auction system has been set to display differentials as opposed to gross values. Each client component on a supplier's computer can generate an index-bidding bid history graph and an index-bidding bid history table based upon the bid information that is received from the auction server.

As illustrated in the bid history graph of FIG. 6, the leading market bid in the interactive bidding event trends downward in the negative range relative to the index. This trend reflects an increasing discount relative to the index.

As noted, it is possible for bidders to submit bids in percentage terms relative to the index, such as a bid of 3% discount to the index. However, bidders may prefer to bid in cents per pound because that was the most common way of calculating bids in this industry. To accommodate this preference, the software would receive bids in absolute values and convert the absolute values to index bids so that the index bid could be applied across the life of the contract. Consider the example shown in Table 2 below.

TABLE 2

| | |
|---|---|
| Absolute bid value (cents/pound) | 0.7502 |
| Index value (cents/pound) at time of bid | 0.7800 |
| Differential (cents/pound) | (0.0298) |
| Index Bid (percent) | (3.82%) |

In this case, the bidder prefers to calculate bids in absolute values at the time of the bid. The absolute value bid (0.7502 cents/pound) is compared with the index at the time of the bid (0.7800 cents/pound) to determine the differential. In this case, the buyer wishes to ensure a constant percentage differential from the index over the life of the contract, so the percentage differential becomes the bid amount committed to by the bidder.

The "Index Bidding" online auction format allows an online real-time interactive auction to take place where bidders are competing by submitting bids relative to a reference point established by the buyer. The reference point may be a third-party industry index or a reference price (or schedule of prices) set by the buyer. All bids are relative to this reference point, permitting apples-to-apples comparison of all bids. For example, bidders may bid a percentage discount/premium against the reference point (e.g. 3% discount), or a difference in absolute value from the reference point (e.g. $0.30 per pound discount).

In many examples of business-to-business auctions, bidding in relative values enables you to create a real-time auction in situations where creating competition using a simple auction format (bidding an absolute dollar value) or a traditional manual process would be cumbersome or impossible. An example is described below.

Bids can be defined relative to a buyer-determined price schedule. In this situation, the buyer may wish to conduct an auction to negotiate an entire schedule of prices for a range of different items. Examples include (1) the negotiation of a transportation contract where "price" is not a single variable but a table of transportation rates that describes pricing for different combinations of distance, delivery urgency and size/weight of goods to be carried, (2) the negotiation of an equipment leasing contract where pricing consists of a table of lease rates with finance charges for different combinations of equipment type and lease terms; (3) the negotiation of a car rental hire contract where pricing consists of a table of daily rental rates for different combinations of car types (compact, mid-size, luxury), length of rental (no. of days) and countries/airports, (4) the negotiation of a contract for catalog items where pricing consists of a published "list" price for hundreds or thousands of items described in the catalog, etc.

In these situations, the buyer wishes to establish a contract with an agreed price for every possible item or combination in a pricing schedule. Individual purchases or orders will be made against this negotiated pricing schedule over the life of the contract. In some cases, the buyer will be able to estimate demand for individual items in the table, but in most situations demand cannot be determined ahead of actual orders being placed. Ultimately, many items in the schedule will not be purchased at all. However, the buyer would like to negotiate a price for each item ahead of actual orders being placed to avoid individual negotiations for each and every item.

Consider the example of an auction for a global corporate contract for rental car hire. Tables 3A–3C capture the primary variables that affect the daily rate for the rental car hire contract: car type, rental duration, and in which country the car is rented.

TABLE 3A

| Category Code | Example Car Type |
|---|---|
| A | Ford Fiesta 1.1 L 3 dr Manual |
| B | Ford Fiesta 1.1 L 5 dr Manual |
| C | Ford Escort 1.4 L Manual |
| D | Ford Mondeo 1.6/1.8 L Manual |
| E | Ford Mondeo 2.0 L Ghia |

TABLE 3B

| Rental Country |
|---|
| United Kingdom |
| United States |
| France |
| Germany |

TABLE 3C

| Rental Period | Range (no. of days) |
|---|---|
| Short | 1–4 Days |
| Medium | 5–27 Days |
| Long | 28–30 Days |

Combining Tables 3A–3C gives a total of 60 different daily rates that could be charged depending on the car type chosen, the airport location and rental period. This is shown below in Table 4.

TABLE 4

| Car Type | Airport Location | Daily Rental Rate | | |
|---|---|---|---|---|
| | | 1–4 Days | 5–27 Days | 28–30 Days |
| A | United Kingdom | $35.50 | $29.75 | $28.50 |
| | United States | $35.25 | $29.50 | $28.25 |
| | France | $36.50 | $30.75 | $29.50 |
| | Germany | $36.00 | $30.25 | $29.00 |
| B | United Kingdom | $38.00 | $32.25 | $31.00 |
| | United States | $37.75 | $32.00 | $30.75 |
| | France | $39.00 | $33.25 | $32.00 |
| | Germany | $38.50 | $32.75 | $31.50 |
| C | United Kingdom | $42.50 | $36.75 | $35.50 |
| | United States | $42.25 | $36.50 | $35.25 |
| | France | $43.50 | $37.75 | $36.50 |
| | Germany | $43.00 | $37.25 | $36.00 |
| D | United Kingdom | $47.00 | $41.25 | $40.00 |
| | United States | $46.75 | $41.00 | $39.75 |
| | France | $48.00 | $42.25 | $41.00 |
| | Germany | $47.50 | $41.75 | $40.50 |
| E | United Kingdom | $55.00 | $49.25 | $48.00 |
| | United States | $54.75 | $49.00 | $47.75 |
| | France | $56.00 | $50.25 | $49.00 |
| | Germany | $55.50 | $49.75 | $48.50 |

In Tables 3A–3C and 4, only a small subset of the potential number of car types and countries are illustrated. The total has been limited in order to simplify the example. In a more realistic example 18 countries and 22 car types could be used. In that Example, a total of 1,188 daily rental rates (18 countries×22 car types×3 rental periods) would result.

In a situation like this, it is very difficult to create competition with a manual negotiation or standard auction process. Demand for each combination of car type, rental location and rental period is difficult to predict in advance. While some information about past rental activity may be available, actual demand would depend upon individual travel patterns and rental purchases made over the course of the year.

For a standard real-time auction, expected volume for each rental combination would have to be known or estimated in advance. For example, if volume were known, bidders would formulate total dollar bids by multiplying the estimated number of rental days for each line item by the daily rental rate they were prepared to bid. Totals for each line item would then be summed to a total dollar bid for a lot. Competition occurs at the lot level, with bidders offering successively lower total dollar bids to win the business. An example of the standard bid format is shown below in Table 5.

TABLE 5

| Line Item | Car Type | Country | Rental Period | Est. Volume (No. of rental days) | Bid Amounts Rental rate ($/day) | Total Bid ($) |
|---|---|---|---|---|---|---|
| 1 | A | UK | 1–4 Days | 1000 | $35.50 | $35,500 |
| 2 | A | UK | 5–27 Days | 200 | $29.75 | $5,950 |
| 3 | A | UK | 28–30 Days | 50 | $28.50 | $1,425 |
| 4 | A | USA | 1–4 Days | 2500 | $35.25 | $88,125 |
| 5 | A | USA | 5–27 Days | 400 | $29.50 | $11,800 |
| 6 | A | USA | 28–30 Days | 100 | $28.25 | $2,825 |
| 7 | A | France | 1–4 Days | 500 | $36.50 | $18,250 |
| 8 | A | France | 5–27 Days | 200 | $30.75 | $6,150 |
| 9 | A | France | 28–30 Days | 100 | $29.50 | $2,950 |
| 10 | A | Germany | 1–4 Days | 750 | $36.00 | $27,000 |
| 11 | A | Germany | 5–27 Days | 300 | $30.25 | $9,075 |
| 12 | A | Germany | 28–30 Days | 50 | $29.00 | $1,450 |
| Total | | | | | | $210,500 |

Without the estimated volume for each line item, it is very difficult to create competition using the standard auction process because there is no way to aggregate business and standardize quotes on a common basis. Standardizing quotes is necessary because of the interactive nature of an online auction. In an online auction, each bidder must be able to view bids placed by other bidders and respond to those bids in real-time to create effective competition. Accordingly, each bid must be comparable in all respects to bids placed by other bidders. In the above example having 1,188 different daily rates for bidders to quote, each supplier can prepare a schedule of quotes showing 1,188 different daily rental rates. Some quote schedules will show better rates for some items and poorer rates for other items. Because there is no volume for each line item, unless one of the quote schedules shows lower rates for every item than quote schedules submitted by competing suppliers, there is no way to rank the schedules and determine which to choose. Worse still, there is no way to feed back rankings or the difference between two competing quote schedules so that suppliers can respond with lower quote schedules.

Consider the two bid schedules shown below as Tables 6 and 7.

TABLE 6

| Line Item | Car Type | Country | Rental Period | Bid Amount Rental rate ($/day) |
|---|---|---|---|---|
| 1 | A | UK | 1–4 Days | $34.50 |
| 2 | A | UK | 5–27 Days | $28.75 |
| 3 | A | UK | 28–30 Days | $27.50 |
| 4 | A | USA | 1–4 Days | $34.25 |
| 5 | A | USA | 5–27 Days | $28.50 |
| 6 | A | USA | 28–30 Days | $27.25 |
| 7 | A | France | 1–4 Days | $37.50 |
| 8 | A | France | 5–27 Days | $31.75 |
| 9 | A | France | 28–30 Days | $30.50 |
| 10 | A | Germany | 1–4 Days | $37.00 |
| 11 | A | Germany | 5–27 Days | $31.25 |
| 12 | A | Germany | 28–30 Days | $30.00 |

TABLE 7

| Line Item | Car Type | Country | Rental Period | Bid Amount Rental rate ($/day) |
|---|---|---|---|---|
| 1 | A | UK | 1–4 Days | $33.50 |
| 2 | A | UK | 5–27 Days | $27.75 |
| 3 | A | UK | 28–30 Days | $26.50 |
| 4 | A | USA | 1–4 Days | $33.25 |
| 5 | A | USA | 5–27 Days | $27.50 |
| 6 | A | USA | 28–30 Days | $26.25 |
| 7 | A | France | 1–4 Days | $38.50 |
| 8 | A | France | 5–27 Days | $32.75 |
| 9 | A | France | 28–30 Days | $31.50 |
| 10 | A | Germany | 1–4 Days | $38.00 |
| 11 | A | Germany | 5–27 Days | $32.25 |
| 12 | A | Germany | 28–30 Days | $31.00 |

The quote schedule in Table 6 has higher rates than Table 7 for the UK and USA, but lower rates for France and Germany. Without volume estimates for each line item it is difficult to decide which bid will result in lower costs, and it is impossible to create a auction with real-time feedback.

The "Index Bidding" online auction format can be used to create an online real-time interacvice auction around a schedule of prices such as car rental rates. In this example, the Index Bidding auction process works as follows:

The buyer first establishes a schedule of "base rental rates" that can be used as a reference point. In the above example, the base rates are the 1,188 daily rental rates from the previous year's annual contract. This schedule of "base rates" is communicated to the bidders prior to the bidding event (as part of the RFQ).

Bidders are required to place bids relative to this schedule of base rates. That is, bidders are required to bid a percent discount or premium for a given lot of business. The same percentage is applied to every daily rental rate within that lot. The auction system then feeds-back the percentage bids to all participants so that each bidder understands how competitive their bid is relative to the other bidders, and how much they would have to change their bid in order to improve their position.

For example, Table 8 shows part of the quote schedule for a bid of 5% discount to the base rates for the USA lot of business.

TABLE 8

| Line Item | Car Type | Country | Rental Period | Base Rental Rate ($/day) | Index Bid (%) | Bid Rental Rates ($/day) |
|---|---|---|---|---|---|---|
| 1 | A | USA | 1–4 Days | $35.25 | (5.00%) | $33.49 |
| 2 | A | USA | 5–27 Days | $29.50 | (5.00%) | $28.03 |
| 3 | A | USA | 28–30 Days | $28.25 | (5.00%) | $26.84 |
| 4 | B | USA | 1–4 Days | $37.75 | (5.00%) | $35.86 |
| 5 | B | USA | 5–27 Days | $32.00 | (5.00%) | $30.40 |
| 6 | B | USA | 28–30 Days | $30.75 | (5.00%) | $29.21 |
| 7 | C | USA | 1–4 Days | $42.25 | (5.00%) | $40.14 |
| 8 | C | USA | 5–27 Days | $36.50 | (5.00%) | $34.68 |
| 9 | C | USA | 28–30 Days | $35.25 | (5.00%) | $33.49 |
| 10 | D | USA | 1–4 Days | $46.75 | (5.00%) | $44.41 |
| 11 | D | USA | 5–27 Days | $41.00 | (5.00%) | $38.95 |
| 12 | D | USA | 28–30 Days | $39.75 | (5.00%) | $37.76 |
| 13 | E | USA | 1–4 Days | $54.75 | (5.00%) | $52.01 |
| 14 | E | USA | 5–27 Days | $49.00 | (5.00%) | $46.55 |
| 15 | E | USA | 28–30 Days | $47.75 | (5.00%) | $45.36 |

This bid can be compared to other bids placed by competing suppliers, since all bids are relative to the same reference point (in this case, the schedule of base rental rates). Table 9 shows a series of bids from different bidders in the auction for the USA lot of business. All bidders view these bids and compete in a real-time auction by increasing the percent discount (or reducing the percent premium) relative to the base rates.

TABLE 9

Lot: 1 (USA)

| Bidder | Bid Time | Index Bid (% Relative to Base Rates) |
|---|---|---|
| Bidder A | 1:01:20 PM | 1.10% |
| Bidder B | 1:03:56 PM | 0.56% |
| Bidder A | 1:04:05 PM | 0.20% |
| Bidder C | 1:05:14 PM | (0.05%) |
| Bidder B | 1:05:31 PM | (0.67%) |
| Bidder D | 1:07:23 PM | (2.33%) |
| Bidder E | 1:08:39 PM | (3.10%) |
| Bidder C | 1:10:11 PM | (3.99%) |
| Bidder A | 1:10:50 PM | (4.50%) |
| Bidder B | 1:11:57 PM | (5.00%) |

The Index Bidding auction format can also be used in situations where the buyer has broad volume estimates to assist in evaluating the quote schedules. In the example above, the auction was set up such that the percentage index bid was applied equally to every line item (daily rental rate in the lot). This assumes that every line item is equally important in determining which quote schedule to choose. However, in some cases the buyer may wish to weight certain line items more heavily than others. For example, a buyer may not be able to estimate volume for each line item, but it may be clear that most of the car rentals were in the 1–4 day rental period. Table 10 shows the estimated car rental volumes by rental period.

TABLE 10

| Rental Period | Proportion of Volume |
|---|---|
| 1–4 Days | 80% |
| 5–27 Days | 15% |
| 28–30 Days | 5% |
| Total | 100% |

In addition, the bidders may wish to offer greater discounts for certain line items than others. For example, it is much easier for the bidders to enter line item rental rates in $/day rather than a percentage discount relative to the base rates. This reflects the fact that costs and margins are commonly computed as a daily rental rate ($/day) in this industry.

Both of these considerations can be accommodated within an Index Bidding auction format. To do this, the buyer would first establish a schedule of "base rental rates" that can be used as a reference point. This schedule of "base rates" is communicated to the bidders prior to the bidding event (as part of the Request for Quote or "RFQ"). Bidders may enter bids at either the lot level or line item level. Line item bids are daily rental rates in $/day. Each line item bid is compared to the base rates to compute a line item percent discount (or premium). A weighted average lot level index bid (percent discount or premium) is calculated from the line item percentages. This may be calculated assuming equal weighting of all line items or by using volume proportions such as Table 10 to place more importance on some line items than others. Bidders may also simply enter a lot level index bid. The lot level bid is applied pro-rata across all line items according to volume proportions such as Table 8 to calculate the line item daily rates. Competition occurs at the lot level by comparing weighted average index bids from all participants in the market. The lot level index bids are fed back to all participants so that each bidder understands how competitive their bid is relative to the other bidders, and how much they would have to change their bid in order to improve their position.

For example, Table 11 shows how a series of line item bids (daily rental rates) are used to compute a lot level index bid according to the volume proportions shown in Table 10. In this case the lot has been simplified (for ease of illustration) to three line items, being the daily rental rates for USA, Car type A, across all rental periods.

TABLE 11

| Line Item | Car Type | Country | Rental Period (Days) | Base Rental Rate ($/day) | Bid Rental Rate ($/day) | Differential ($/day) | Differential (%) | Volume Proportion (%) | Weighted Average (%) |
|---|---|---|---|---|---|---|---|---|---|
| 1 | A | USA | 1–4 | $35.25 | $34.00 | ($1.25) | (3.55%) | 80% | (2.84%) |
| 2 | A | USA | 5–27 | $29.50 | $27.75 | ($1.75) | (5.93%) | 15% | (0.89%) |
| 3 | A | USA | 28–30 | $28.25 | $26.25 | ($2.00) | (7.08%) | 5% | (0.35%) |
| Weighted Average Index Bid: | | | | | | | | | (4.08%) |

The weighted average lot level index bid is entered into the auction and compared to bids placed by all other bidders. This is illustrated below in Table 12 (bid placed by Bidder G was calculated in Table 11).

TABLE 12

Lot: 1 (USA)

| Bidder | Bid Time | Index Bid (% Relative to Base Rates) |
|---|---|---|
| Bidder A | 1:01:20 PM | 1.10% |
| Bidder B | 1:03:56 PM | 0.56% |
| Bidder A | 1:04:05 PM | 0.20% |
| Bidder C | 1:05:14 PM | (0.05%) |
| Bidder B | 1:05:31 PM | (0.67%) |
| Bidder D | 1:07:23 PM | (2.33%) |
| Bidder E | 1:08:39 PM | (3.10%) |
| Bidder C | 1:10:11 PM | (3.99%) |
| Bidder G | 1:12:30 PM | (4.08%) |
| Bidder A | 1:10:50 PM | (4.50%) |
| Bidder B | 1:11:57 PM | (5.00%) |

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing auctions the auction functions can be equally applied to upward pricing auctions. Thus, it is intended that the present invention cover the modifications and variations of this invention provided they come within the scope of the appended claims and their equivalents.

What is claimed is:

1. A method of conducting an electronic online auction between a plurality of potential bidders for a lot defined by an originator of the auction, comprising the steps of:
   (a) establishing a price index as a basis for establishing an arbitrary non-zero competitive price point;
   (b) communicating said price index to each of said plurality of potential bidders;
   (c) receiving a corresponding bid from one or more of said plurality of potential bidders, wherein each said received bid includes a bid value that is specified relative to said price index;
   (d) for each said received bid, calculating a corresponding bid differential between the bid value and said price index, wherein each said bid differential is zero, positive or negative depending on whether the bid value for the corresponding received bid is equal to, higher or lower than said price index respectively; and
   (e) transmitting each said bid differential to said plurality of potential bidders, wherein a price paid to a winning bidder for said lot during a term of a sale agreement associated with said lot varies after close of said auction with fluctuations in market value of said price index.

2. The method of claim 1, wherein at least one received bid in step (c) is a percentage difference relative to said price index, and step (d) comprises setting the corresponding bid differential to said percentage difference.

3. The method of claim 1, wherein at least one received bid in step (c) is an absolute difference relative to said price index, and step (d) comprises setting the corresponding bid differential to a percentage that is equivalent to said absolute difference divided by said price index.

4. A method of bidding in an electronic auction, comprising the steps of:
   a) receiving a bidding index reflective of a price of an item to be auctioned;
   b) specifying a bid for said item, wherein said bid includes a bid value that is relative to said bidding index for said item;
   c) calculating a bid differential between said bid value and said bidding index, wherein said bid differential is zero, positive or negative depending on whether the bid value is equal to, higher or lower than said bidding index respectively, and wherein value of said bid differential remains constant regardless of fluctuations in market value of said bidding index;
   d) submitting said bid differential into the electronic auction; and
   e) receiving a feedback from the electronic auction regarding a rank of the bid, wherein said rank is determined using said bid differential.

5. A computer-readable medium that includes instructions for entering bids in an electronic auction wherein said instructions, when executed by a processor, cause the processor to:

a) receive a bidding index reflective of a price of an item to be auctioned;

b) allow receipt of a bid for said item, wherein said bid includes a bid value that is relative to said bidding index for said item;

c) calculate a bid differential between said bid value and said bidding index, wherein said bid differential is zero, positive or negative depending on whether the bid value is equal to, higher or lower than said bidding index respectively, and wherein value of said bid differential remains constant regardless of fluctuations in market value of said bidding index;

d) submit said bid differential into the electronic auction; and e) receive a feedback from the electronic auction regarding a rank of the bid.

6. The method of claim 1, further comprising allowing a display of each said bid differential on a corresponding computer terminal for each of said plurality of potential bidders.

7. The method of claim 1, further comprising:

(f) determining a corresponding bidding rank for each of said plurality of potential bidders using each said bid differential; and (g) communicating each said bidding rank to a corresponding one of said plurality of potential bidders.

8. The method of claim 1, wherein at least one received bid in step (c) is a gross bid amount, and step (d) comprises setting the corresponding bid differential as an absolute difference between the gross bid amount and said price index.

9. The method of claim 1, wherein at least one received bid in step (c) is a gross bid amount, and step (d) comprises setting the corresponding bid differential as a percentage difference between the gross bid amount and the price index.

10. The method of claim 1, wherein at least one received bid in step (c) is an absolute difference relative to said price index, and step (d) comprises setting the corresponding bid differential to said absolute difference.

11. The method of claim 1, wherein at least one received bid in step (c) is a percentage difference relative to the price index, and step (d) comprises setting the corresponding bid differential to the percentage difference multiplied by the price index.

12. The method of claim 1, wherein said price index is an industry standard index.

13. The method of claim 1, wherein said price index is defined by said originator of the electronic auction.

14. The method of claim 1, wherein said price index is a schedule of prices, wherein at least one received bid in step (c) is comprised of relative bids for each item in the price schedule, and step (d) comprises setting the corresponding bid differential using a weighted average of the relative bids for the price schedule.

15. The method of claim 4, wherein said bid value in step (b) is a gross bid amount, and step (c) comprises setting the bid differential as an absolute difference between the gross bid amount and said bidding index.

16. The method of claim 4, wherein said bid value in step (b) is a gross bid amount, and step (c) comprises setting the bid differential as a percentage difference between the gross bid amount and the bidding index.

17. The method of claim 4, wherein said bid value in step (b) is an absolute difference relative to said bidding index, and step (c) comprises setting the bid differential to said absolute difference.

18. The method of claim 4, wherein said bid value in step (b) is a percentage difference relative to the bidding index, and step (c) comprises setting the bid differential to the percentage difference multiplied by the bidding index.

19. The method of claim 4, wherein the bid value in step (b) is a percentage difference relative to said bidding index, and step (c) comprises setting the bid differential to said percentage difference.

20. The method of claim 4, wherein the bid value in step (b) is an absolute difference relative to said bidding index, and step (d) comprises setting the bid differential to a percentage that is equivalent to said absolute difference divided by said bidding index.

21. A bidding device operated by a potential bidder during an electronic auction comprising:

means for receiving a price index from a sponsor of the auction, wherein the price index is reflective of a price of an item to be auctioned;

means for allowing said potential bidder to specify a bid for said item, wherein said bid includes a bid value that is relative to said price index for said item;

means for calculating a bid differential between said bid value and said price index, wherein said bid differential is zero, positive or negative depending on whether the bid value is equal to, higher or lower than said price index respectively, and wherein value of said bid differential remains constant regardless of fluctuations in market value of said price index;

means for allowing said potential bidder to submit said bid differential into the electronic auction; and means for receiving a feedback from the electronic auction regarding a rank of the potential bidder relative to other bidders in said auction.

22. The bidding device of claim 21, further comprising means for displaying at least one of said rank of said potential bidder; said price index; said bid specified by said potential bidder; and said bid differential.

23. The bidding device of claim 21, wherein said means for calculating said bid differential includes at least one of the following:

means for setting said bid differential as an absolute difference between a gross bid amount and said price index when said bid value is said gross bid amount;

means for setting said bid differential as a percentage difference between a gross bid amount and the price index when said bid value is said gross bid amount;

means for setting said bid differential to an absolute difference when said bid value is said absolute difference relative to said price index;

means for setting said bid differential to a percentage difference multiplied by said price index when said bid value is said percentage difference relative to said price index;

means for setting said bid differential to a percentage difference when said bid value is said percentage difference relative to said price index;

means for setting said bid differential to a percentage that is equivalent to an absolute difference divided by said price index when said bid value is said absolute difference relative to said price index; and means for setting said bid differential to a weighted average of a plurality of bids specified by said potential bidder when said price index is a schedule of prices and when said potential bidder submits said plurality of bids for each item in said price schedule.

24. A method of conducting an electronic online auction between a plurality of potential bidders for a lot defined by an originator of the auction, comprising the steps of:
  (a) using a price index as a basis for establishing an arbitrary non-zero competitive price point;
  (b) receiving a corresponding bid differential from one or more of said plurality of potential bidders, wherein each said bid differential is specified relative to said price index, wherein each said bid differential is zero, positive or negative depending on whether the corresponding potential bidder's bid is equal to, higher or lower than said price index respectively, and wherein value of each said bid differential remains constant regardless of fluctuations in market value of said price index; and
  (c) transmitting each said bid differential to said plurality of potential bidders.

25. A method of conducting an electronic online auction between a plurality of potential bidders for a lot defined by an originator of the auction, comprising the steps of:
  (a) using a price index as a basis for establishing an arbitrary non-zero competitive price point;
  (b) receiving a corresponding bid from one or more of said plurality of potential bidders, wherein each said received bid includes a bid value that is specified relative to said price index;
  (c) for each said received bid, calculating a corresponding bid differential between the bid value and said price index, wherein each said bid differential is zero, positive or negative depending on whether the bid value for the corresponding received bid is equal to, higher or lower than said arbitrary competitive price point respectively; and
  (d) transmitting each said bid differential to said plurality of potential bidders, wherein a price paid to a winning bidder for said lot during a term of a sale agreement associated with said lot varies after close of said auction with fluctuations in market value of said price index.

* * * * *